Patented July 12, 1949

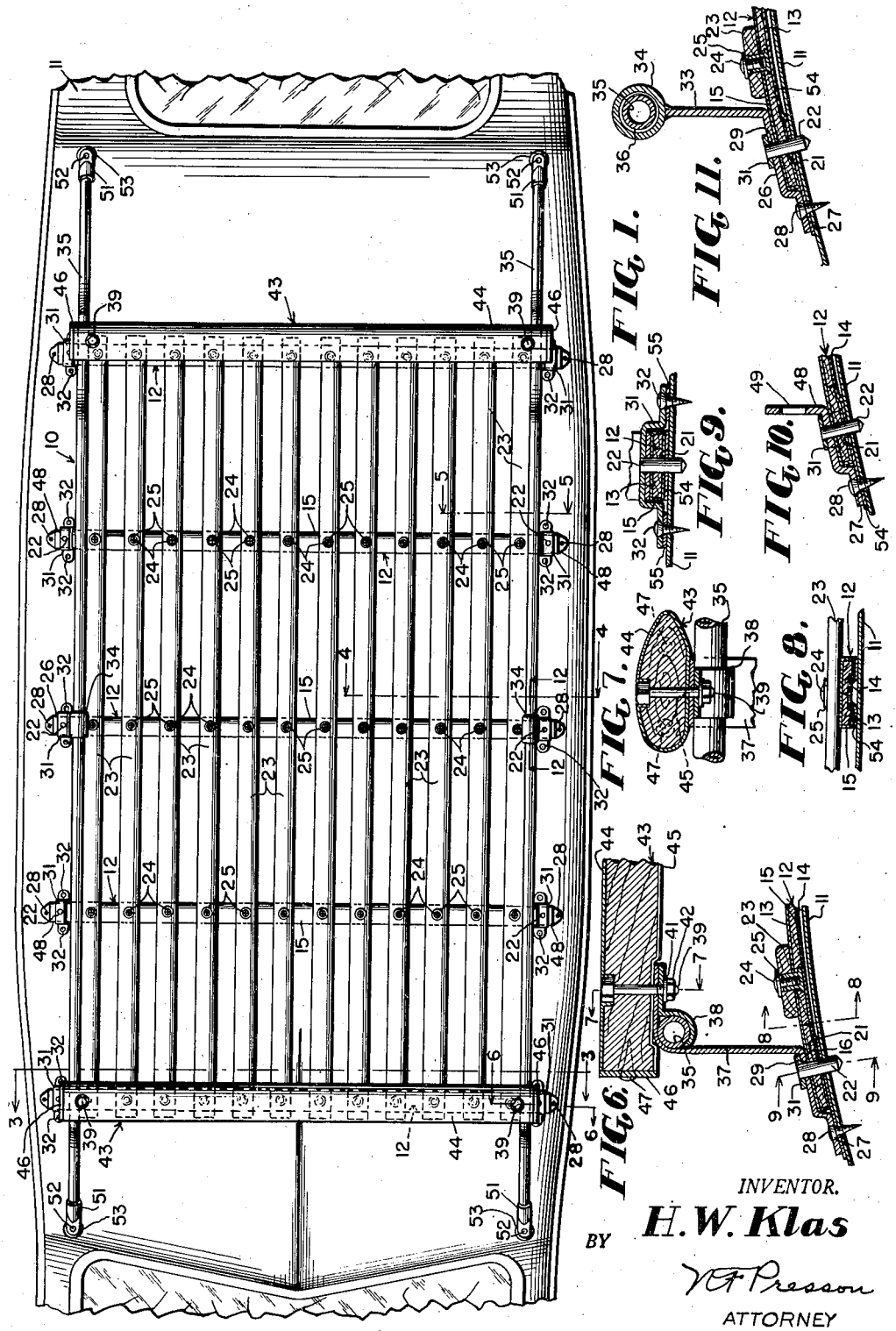

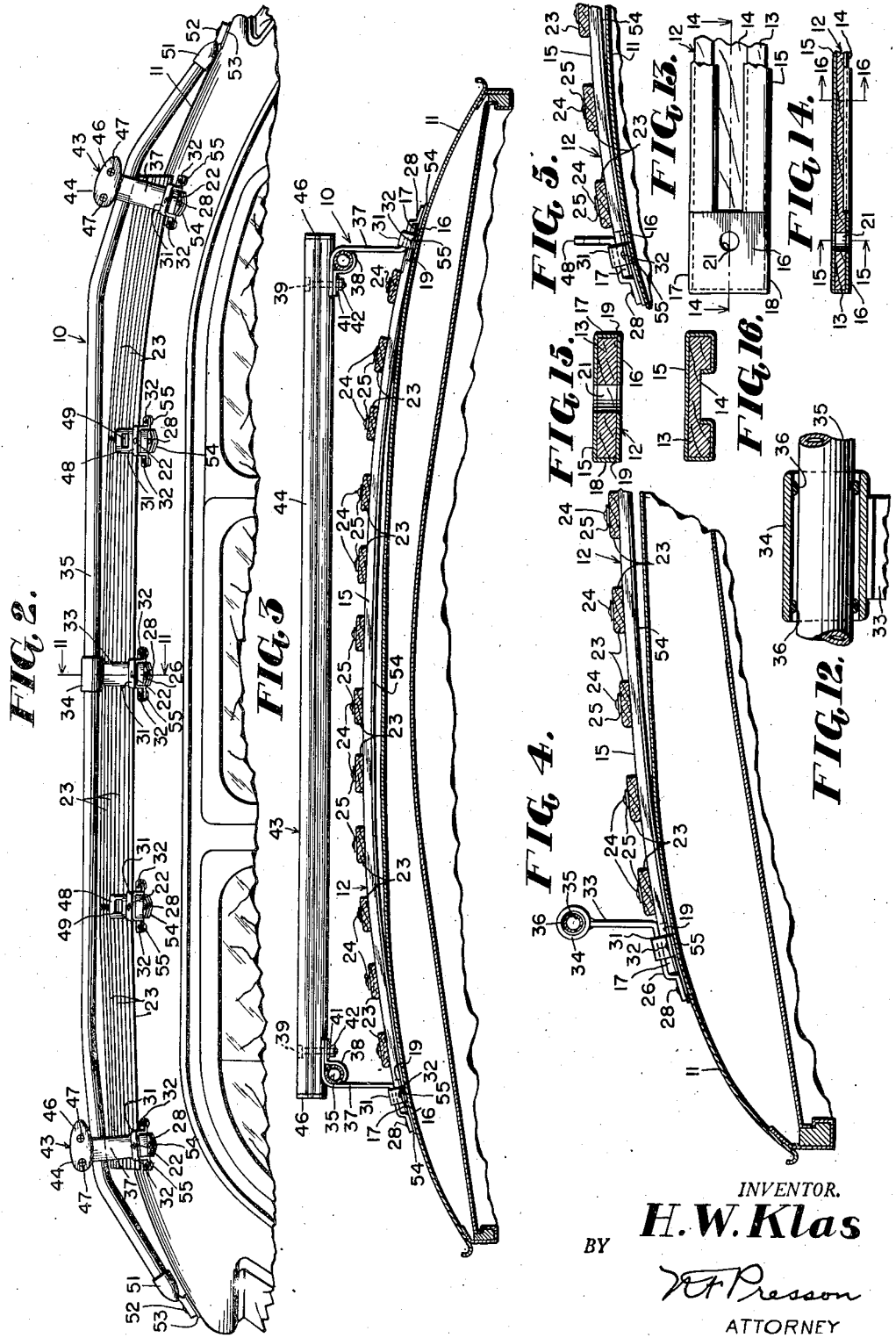

2,475,903

UNITED STATES PATENT OFFICE 2,475,903

AUTOMOBILE TOP CARRIER

Harold W. Klas, Sylvania, Ohio

Application August 22, 1947, Serial No. 770,130

6 Claims. (Cl. 224—42.1)

This invention relates to a luggage or parcel carrier intended for general use and particularly well adapted to be mounted on the top of a motor vehicle and more specifically to an automobile top carrier for heavy loads. Various carriers have heretofore been devised for carrying loads on the top of an automobile. Such carriers, however, when subjected to a heavy load have been found ineffective to prevent sagging or denting of the automobile top near the central portion thereof by reason of the application of the load at or near the central portion of the top. In other cases, where the heavy load has been applied near the edge portions of the top, the carrier is required to be of such bulky structure to provide the necessary rigidity thereto as to cause the appearance thereof to be unsightly and therefore undesirable for use with automobiles of modern design.

The automobile top carrier of the present invention possesses all of the advantages of the luggage carriers for automobile tops heretofore devised and none of the foregoing disadvantages. In accordance with the present invention, this is accomplished by providing a carrier structure of new and improved design having a plurality of flexible arch members secured at the ends thereof to the automobile top near the side portions thereof and arranged transversely with respect thereto such that a plurality of truss structures are provided comprising the flexible members aforesaid and an automobile top which now is employed as a tension member to prevent spreading of the ends of the arched members when a load is applied thereto. The truss structure thus formed is provided with a plurality of strips of rigid material secured thereto and arranged longitudinally of the automobile whereby the load is applied throughout a substantial portion of several of the arch members.

One of the objects of my invention is to provide a carrier rack arranged and adapted to be readily adjusted to fit upon and secure to the top or roof of an ordinary automobile body.

Another object is to provide a carrier unit of new and improved design which distributes the weight of the load along two lines of pressure near the edge portions of the top and substantially parallel with the sides of the body and which blends with the stream lined contour of the body.

Still another object is to provide a new and improved carrier rack for the top of an automobile in which the load is carried by a plurality of flexible arched truss members secured to the top of the body along the side portions thereof.

Another object of the invention is the provision of an improved carrier structure of the character disclosed so constructed and arranged as to provide a plurality of flexible truss members adapted to be readily fitted upon and secured to the roof of an automobile body.

A further object is the provision of a carrier rack of new and improved design employing a new and different principle of operation which will be economical to manufacture, reliable in operation, and which possesses all of the qualities of ease of assembly with the automobile body, ruggedness and durability in service.

Still other objects, advantages, and improvements will be apparent from the following description, taken in connection with the accompanying drawings, of which:

Fig. 1 is a plan view of the luggage carrier of the present invention in accordance with a preferred embodiment thereof and secured to the top of an automobile;

Fig. 2 is a view in elevation of the carrier device of Fig. 1;

Fig. 3 is a view in section taken along the line 3—3 of Fig. 1;

Fig. 4 is a fragmentary view taken along the line 4—4 of Fig. 1;

Fig. 5 is a view in section and partially broken away taken along the line 5—5 of Fig. 1;

Fig. 6 is a fragmentary view in section taken along the line 6—6 of Fig. 1;

Fig. 7 is a view showing one of the cross bars in section and taken substantially along the line 7—7 of Fig. 6;

Figs. 8 and 9 are sectional views taken along the lines 8—8 and 9—9 respectively of Fig. 6;

Fig. 10 is a fragmentary view taken along the line 10—10 of Fig. 1;

Fig. 11 is a view in section and partially broken away taken along the line 11—11 of Fig. 2;

Fig. 12 is an enlarged view of a portion of one of the carrier rails taken along the line 12—12 of Fig. 1 and showing the method of securing the rail to one of the supporting brackets;

Fig. 13 is a bottom view, somewhat enlarged, of an end portion of one of the flexible truss members;

Fig. 14 is a sectional view taken along the line 14—14 of Fig. 13; and

Figs. 15 and 16 are enlarged sectional views of one of the arched truss members taken along the lines 15—15 and 16—16 respectively of Fig. 14.

Referring now to the drawings for a more complete understanding of the invention on which like numerals of reference are employed to designate like parts throughout the several views, and more particularly to Figs. 1 and 2 thereof, there is shown thereon a luggage carrier indicated generally by the numeral 10 secured to the top 11 of an automobile. The structure comprises a plurality of flexible arch members generally indicated at 12 composed of a length of material 13 suitable for the purpose such, for example, as hard wood having a longitudinal recess 14, Fig. 16, therein for receiving the turned up edges of a length of metal 15 such, for example, as steel wrapped tightly thereabout substantially as shown. Each of the end portions of the wooden strip 13 is preferably enclosed by an additional length 16 of the metal folded over the end thereof substantially as shown, Figs. 13 and 14, two tabs 17 and 18 formed transversely on the metal strip 15 being bent downwardly and secured to the length of metal 16 as at 19 in any suitable manner as by welding or brazing the parts together thereby to form a pair of pockets closely fitted about the ends of the wooden strip 13. The ends of the arch members are provided with a pair of apertures 21 respectively arranged therein and adapted to receive a pin 22.

The various arched members 12 are secured in spaced parallel relation with respect to one another and to a plurality of elongated wooden strips 23 in any suitable manner as by the bolts or rivets 24, and washer 25 preferably being arranged beneath the head of each of the bolts or rivets substantially as shown.

The end portions of the centrally arranged arched member 12 are clamped to the top 11 of the automobile by a member 26 having a tapered aperture 27 therein adapted to receive the head of a self-tapping screw 28 which is forced into and engages the steel top of the automobile sufficiently to provide a tight clamping connection between the top and the lower end of the member 26, Fig. 11. The member 26 is also provided with an aperture 29 within which the pin 22 is adapted to be arranged. A clamping member 31 to which the pin 22 is secured is adapted to engage the arched member 12 and additionally clamp the arched member 12 to the top when the clamping member 31 is drawn snugly against the top by the screws 32, Fig. 9.

The member 26 includes an upstanding portion 33 to which is secured in any suitable manner, as by welding, a tubular coupling member 34 arranged to receive and support at the central portion thereof a tubular rail 35, a pair of resilient gaskets 36, Fig. 12, being preferably arranged between the rail and the coupling member 34 substantially as shown.

The rail 35 is additionally supported by a pair of supports 37 to which it is secured as by the clamping member 38 and bolt 39, a washer 41 being preferably arranged between the nut 42 threaded thereon and the clamping member 38. The bolt 39 also clamps an elongated strip or strut 43 to the support 37 substantially as shown thereby providing an arrangement in which a pair of struts or cross bars 43 supported at the end portions thereof by supports 37 are arranged above the ends of the carrier and transverse to the body of the automobile whereby, if desired, heavy elongated loads such, for example, as a ladder, lengths of lumber, a boat, canoe or the like may be placed on the pair of cross bars or struts 43 and transported by the carrier structure.

The supporting members 37 are formed at the lower portion thereof in a manner similar to the members 26 and, like the members 26, are secured to the top by clamping members 31 respectively associated therewith, a pin 22 being employed in each case to prevent shifting of the end portions of the arch members 12 in response to a load applied thereto. Each of the cross bars 43 is preferably covered with a thin metallic sheet 44 wrapped thereabout and butted together along the edges thereof as at 45, Fig. 7. The metal sheet may be secured in any convenient manner at the butted portion thereof as by spot welding or stapling to the wooden core of the cross bar. Each of the ends of the cross bar is preferably covered by an end plate 46 secured thereto in any suitable manner as by the screws 47. Preferably, though not necessarily, the end plate is attached to and made integral with the metallic sheet 44 along the line of contact therewith.

The arch members intermediate the central and end portions of the carrier are secured to the automobile top at each of the end portions thereof by a clamping member 48 generally similar to the clamping members 26 except that the upstanding portion thereof is not adapted to support the rail 35 but, in lieu of this supporting feature, the upturned portion of the clamping member 48 is provided with an elongated aperture 49 adapted to receive a strap whereby, if desired, the load may be secured to the carrier by one or more straps disposed within the apertures 49 of the clamping members 48.

Each of the ends of the rail 35 is secured to a terminal member 51 in any suitable manner as by soldering or brazing the parts together, the terminal member being adapted to receive a screw 52 for establishing a secure clamping connection between the member 51 and the automobile top. There is preferably arranged between each of the terminal members 51 and the automobile top, a gasket 53 to insure a water tight connection therebetween. There is also preferably employed between the ends of the arched members 12 and the top of the automobile additional lengths of gasket material 54 to prevent squeaks and leakage of water through the top at the points of support of the carrier thereon, a single length of gasket material 54, for example, preferably extending across the top beneath each of the arch members 12 thereby to provide a yieldable cushion between the arch members and the top adapted to prevent scratching or marring of the top by the arch members in the event that the load applied to the arch members should be sufficient under the conditions of service to cause the arch members to be deflected from their original position sufficiently to be brought into contact with the central portion of the automobile top. Additional gaskets 55 are also preferably provided between the ends of the clamping member 31 and the top to insure a water tight joint about the screws 32 or, if desired, the gaskets 55 may be formed integrally with the length of gasket material 54.

When assembling the carrier to the top of the automobile I have found it desirable to secure one end of each of the arched members to the top and place under each of the arched members two flat spacing devices of substantially ⅛ inch thickness respectively about one-third of the distance from each end of the members. The other end of each of the arched members is now secured to the top and when this has been done, the spacing devices are readily removed by moving them toward the central portion of the arched members where the separation between the arched members and the top is somewhat greater than at the initial position of the devices. The spacing devices may now be easily removed and, if desired, discarded. The terminal members 51 are secured to the top by the screws 52 and the installation of the carrier is complete, it being of course understood that during the assembly operation the gaskets 53, 54 and 55 were placed at the various points of connection of the carrier with the top. It will also be understood that during the foregoing assembly operation the top was drilled to receive the pins 22 associated with the clamping members 21.

The principle of operation of the carrier herein disclosed is the principle of a truss composed of two members, one of which is in tension and the second, by reason of the arched construction thereof, is in compression when the load is applied thereto. The invention employs the top of a modern automobile having a body of all steel construction as the tension member, the flexible arched members secured thereto being composed preferably of hard wood to distribute the load along a substantial portion of the arch and to prevent buckling when a load is applied thereto, the wood of which the arch is composed being preferably encased in metal to provide reinforcement thereof and to protect the wood from deterioration under the conditions of service.

Furthermore by employing the arrangement herein disclosed I have provided a carrier structure for attachment to the top of an automobile in which the vertical component of the load is applied along two lines of pressure to the automobile top near the edge portions thereof thereby greatly increasing the load which the carrier is adapted to carry without causing the automobile top to be dented or sag as the result of this load. Also, if desired, the number of arch members 12 may be increased or decreased and the number of strips 23 secured thereto may be varied without a departure from my invention herein disclosed and claimed.

While the invention has been described in detail with respect to one embodiment thereof which gives satisfactory results, it will be understood by those skilled in the art to which the invention pertains, after understanding the invention, that various changes and modifications may be made without departing from the spirit and scope of the invention, and it is my intention, therefore, in the appended claims to cover all such changes and modifications.

What is claimed as new and desired to be secured by Letters Patent of the United States is:

1. A luggage or parcel carrier unit for an automobile top, said carrier unit comprising a group of elongated members arranged in spaced relation for extending longitudinally along the automobile top and adapted to support a load, a plurality of flexible arched truss members arranged in spaced relation for supporting said elongated members and extending transversely across said automobile top, two of said arched truss members respectively being positioned at the opposite ends of the elongated members of said group and other of said truss members being positioned intermediate the ends of the elongated members of the group, means for securing said elongated members to the truss members at their crossing points, and means for securing the ends of said arched truss members to the automobile top with the central portion of each of the truss members slightly raised above the top whereby a load applied to said elongated members causes a compressional force to be applied to said truss members and a tensional force to be applied to those portions of the automobile top beneath the truss members.

2. In combination with an automobile top, a luggage carrier comprising a plurality of arched members, a plurality of elongated strips of rigid material connected to each of said members and adapted to support a load thereon, means including a plurality of clamping devices for securing the ends of said arched members to the top in transverse relation thereto and with the central portion of each of said members slightly raised above the top, a pair of guard rails arranged longitudinally with respect to the automobile and secured at the ends thereof to said top, and means on said clamping devices for additionally supporting said rails at a predetermined distance above said elongated strips.

3. In combination with a vehicle having a top, a luggage rack comprising a plurality of flexible arched members, a plurality of elongated strips of rigid material connected to each of said arched members and adapted to support a load, a pair of guard rails disposed longitudinally with respect to the vehicle and secured at the ends thereof to said top, means for securing the ends of the arched members to the top in transverse relation thereto and with the central portion of each of said members slightly raised above the top, said last named means being constructed and arranged to support said rails at a predetermined distance above the ends of the arched members, and a pair of streamlined cross bars secured to said guard rails above the end portions of said elongated strips and arranged transversely with respect to the said vehicle, said cross bars being sufficiently rigid to support a heavy elongated load thereon.

4. In combination with an automobile top, a carrier unit comprising a plurality of elongated members arranged in parallel spaced relation and adapted to support a load, a plurality of flexible arched truss members secured transversely to said elongated members, each of said truss members having reinforcing means throughout the length thereof, and means for clamping the ends of the arched members and reinforcing means to the top in transverse relation thereto and with the central portion of each of the arched members slightly raised above the top whereby compressional and tensional forces are applied to the arched members and to the top respectively when the load is supported by said elongated members.

5. In combination with an automobile top, a carrier unit comprising a plurality of elongated wooden members arranged in parallel spaced relation and adapted to carry a load, a plurality of flexible arched truss members constructed and arranged to be clamped transversely to said top with the central portion of each of the arched members slightly raised above the top, each of said arched members having a recessed portion extending longitudinally thereof, means for securing said elongated wooden members to the arched members, a plurality of reinforcing strips composed of metal and wrapped about said arched members, each of said strips having the longitudinal edges thereof bent inwardly and fitted within one of said recessed portions and the end portions thereof respectively formed about the ends of the arched member to provide a pair of close fitting pockets thereabout, means including a U-shaped clamping device secured to the pocket for preventing movement between each end of the arched members and the top when a load is applied to the unit, and means for securing said clamping devices to the top.

6. In combination with an automobile top, a luggage carrier comprising a plurality of flexible arched members, load supporting means connected to each of said arched members, means including a plurality of clamps for securing the ends of the arched members to the top in transverse relation thereto and with the central portion of each of the arched members slightly raised above the top whereby a load applied to said load supporting means causes a compressional force to be applied to said members and a tensional force to be applied to that portion of the top beneath the members, and a plurality of resilient gaskets disposed between the ends of the arched members, the clamps and the top for preventing squeaks therebetween or the entrance of water through the top at said clamps.

HAROLD W. KLAS.

REFERENCES CITED

The following references are of record in the file of this patent:

UNITED STATES PATENTS

| Number | Name | Date |
|---|---|---|
| 1,179,090 | Gray | Apr. 11, 1916 |

FOREIGN PATENTS

| Number | Country | Date |
|---|---|---|
| 776,636 | France | Nov. 8, 1934 |